(12) United States Patent
Woodward, Jr. et al.

(10) Patent No.: US 7,397,825 B2
(45) Date of Patent: Jul. 8, 2008

(54) TRANSPORT STREAM DEJITTERER

(75) Inventors: William D. Woodward, Jr., Lilburn, GA (US); Howard G. Pinder, Norcross, GA (US)

(73) Assignee: Scientific-Atlanta, Inc., Lawrenceville, GA (US)

(*) Notice: Subject to any disclaimer, the term of this patent is extended or adjusted under 35 U.S.C. 154(b) by 883 days.

(21) Appl. No.: 10/797,227

(22) Filed: Mar. 10, 2004

(65) Prior Publication Data
US 2005/0201399 A1 Sep. 15, 2005

(51) Int. Cl.
*H04J 3/06* (2006.01)
(52) U.S. Cl. .................. 370/516; 370/235; 370/412
(58) Field of Classification Search .......... 370/464, 370/503, 509, 516, 512, 514, 324, 350, 395.61, 370/395.62, 252, 253, 412, 235
See application file for complete search history.

(56) References Cited

U.S. PATENT DOCUMENTS

| | | | | |
|---|---|---|---|---|
| 5,640,388 A | * | 6/1997 | Woodhead et al. | 370/468 |
| 5,966,387 A | * | 10/1999 | Cloutier | 370/516 |
| 6,111,896 A | * | 8/2000 | Slattery et al. | 370/535 |
| 6,631,144 B1 | * | 10/2003 | Johansen | 370/516 |
| 6,650,719 B1 | * | 11/2003 | Baker | 375/371 |
| 7,027,456 B1 | * | 4/2006 | Chen | 370/412 |
| 2003/0133462 A1 | | 7/2003 | Schoenblum | |

FOREIGN PATENT DOCUMENTS

WO   WO 02/15449   2/2002

OTHER PUBLICATIONS

U.S. Appl. No. 10/829,568, filed Apr. 22, 2004, Rate Limited Control Mechanism for MPEG PCR Dejittering W.G. Woodard Scientific-Atlanta, Inc. Reel 015260—Frame 0693.

* cited by examiner

*Primary Examiner*—Ricky Ngo
*Assistant Examiner*—Wei-Po Kao

(57) ABSTRACT

A transport stream transmitter receives a jittered stream of network frames carrying a stream of transport packets. The transport stream transmitter de-encapsulates the stream of transport packets from the network frames and dejitters and transmits the stream of network frames.

24 Claims, 8 Drawing Sheets

TRANSPORT STREAM DEJITTERER

TECHNICAL FIELD

The present invention is generally related to broadband communication systems, and, more particularly, is related to reducing jitter in broadband communication systems.

BACKGROUND OF THE INVENTION

Modern subscriber television systems (STS) transmit digital content, which is packetized, from a headend to a subscriber. The digital content is typically provided in a format such as MPEG or in other packet formats known to those skilled in the art. Operators of STS prefer to provide programs in digital format because digital programs provide superior fidelity and lower bandwidth in comparison to analog programs. However, packetized digital programs must be properly synchronized for the subscriber to be able to properly access them.

Briefly described, an encoder receives an analog program and encodes the program into its constituent video and audio elementary streams, which are packetized and known as packetized elementary streams (PES). The packets of the PES are variable length, and the packetized elementary streams include timing information so that the packets of audio content can be properly synchronized with the packets of video content by a decoder when the program is accessed by a user.

In a typical STS, instead of variable length packets, fixed length transport packets are transmitted from the headend to the subscriber by packetizing the variable PES packets into one or more transport packets. Again, the transport packets include timing information so that a subscriber having a digital subscriber communication terminal (DSCT) can decode the program. The DSCT uses the timing information to match the frequency of its internal clock to the frequency of the clock of the encoder that generated the transport packets. However, at the headend, jitter is often introduced into the transport streams of a program because, among other things, multiple transport streams of different programs are multiplexed together, and because routing through the headend and other processing introduces variable delay. Thus, what is sought is a method and apparatus for removing jitter from the transport streams of a program such that the DSCT receiving the program can synchronize the elementary streams of the program.

STS's also provide a service known as video-on-demand (VOD), in which a subscriber can request a prerecorded program or movie or instance of service. For the purposes of this disclosure a program or movie or other instance of service that is provided to a subscriber or offered by a STS to the subscriber is referred to as a program. VOD programs are often stored in a VOD pump, which is typically located at the headend of the STS. The stored VOD programs include the timing information used for synchronizing the clock of the subscriber's DSCTs with the clock of the encoder that packetized the program. Typically, a VOD pump does not output a requested program at the steady stream rate of the encoder. Instead, the VOD pump clumps multiple transport packets into a network frame and transmits the network frame to a transmitter, such as a quadrature amplitude modulator (QAM), for transmission to the subscriber's DSCT. Consequently, at the transmitter the transport streams are jittered by both variable delay in the transmission pathway between the VOD pump and the transmitter and by the clumping of multiple transport packets into a single network frame. Thus, what is also needed is a system and method for reducing jitter by correcting for variable delay and by compensating for clumping of transport packets in network frames.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
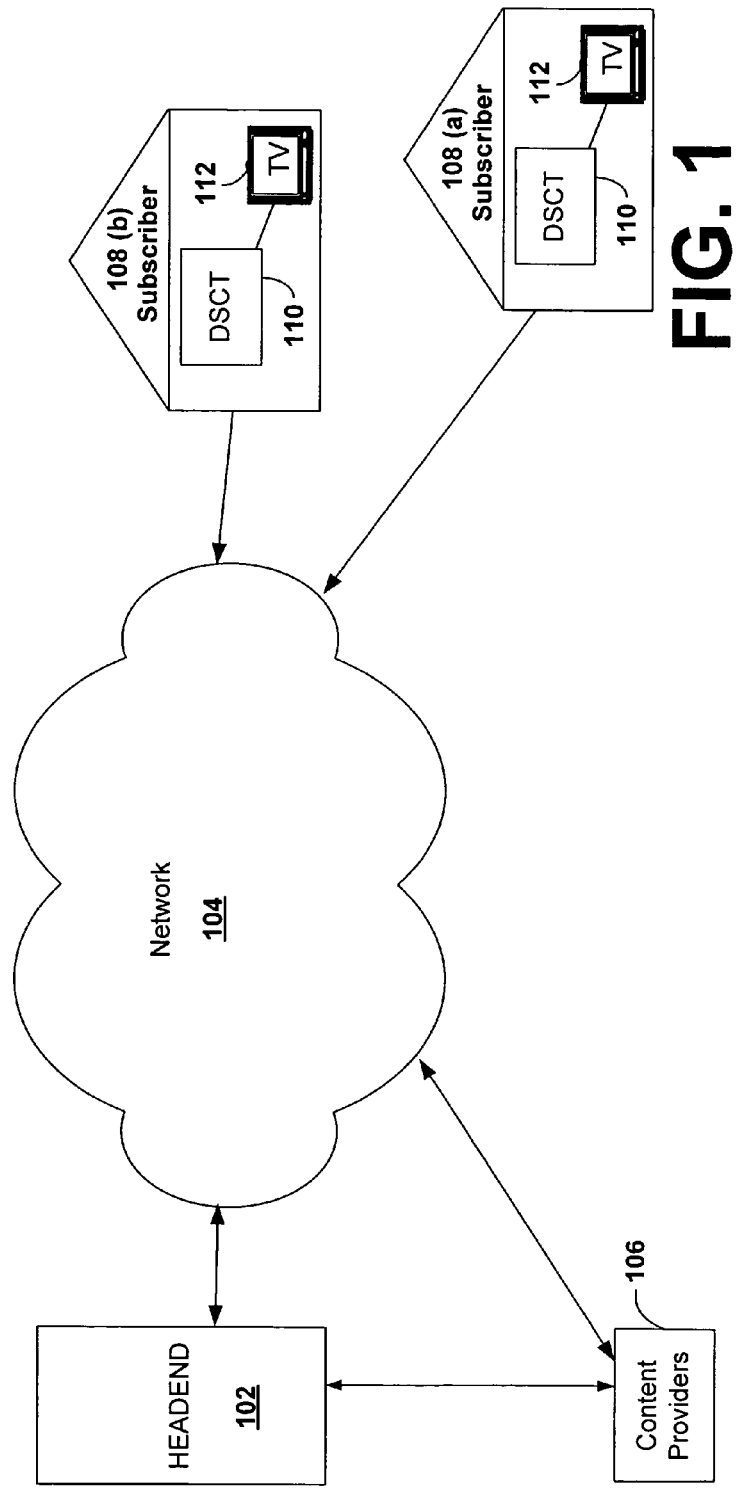
FIG. 1 is a block diagram of a broadband communications system, such as a subscriber television system, in which the preferred embodiment of the present invention may be employed.

Preferred embodiments of the present invention will be described more fully hereinafter with reference to the accompanying drawings in which like numerals represent like elements throughout the several figures, and in which several exemplary embodiments of the invention are shown. The present invention may, however, be embodied in many different forms and should not be construed as limited to the embodiments set forth herein. The examples set forth herein are non-limiting examples and are merely examples among other possible examples.

One way of understanding the preferred embodiments of the invention includes viewing them within the context of a subscriber television system (STS). Thus, the preferred embodiments of the invention include, among other things, systems and methods for removing jitter from transport streams carried by a STS. The preferred embodiments of the invention also include systems and methods for removing jitter caused by the clumping of transport streams into network frames. Furthermore, the preferred embodiments of the invention also include, among other things, systems and methods for removing jitter from a transport stream by generating new timing information for the transport stream and transmitting the transport stream with the new timing information to the DSCT.

Because the preferred embodiments of the invention can be understood in the context of a subscriber television system environment, an initial description of a subscriber television system (STS) is provided and then followed by a description of select components that are included within a headend of the subscriber television system. Also, a dejitter, which implements preferred embodiments of the invention and which is included in the headend at the headend, is described.

The preferred embodiments of the invention may, however, be embodied in many different forms and should not be construed as limited to the embodiments set forth herein;

rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among many other examples contemplated but not shown.

Furthermore, it should be noted that the logic of the preferred embodiment(s) of the present invention can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present invention includes embodying the functionality of the preferred embodiments of the present invention in logic embodied in hardware or software-configured mediums.

Subscriber Television System Overview

An overview of an exemplary STS, which is also sometimes referred to as a Digital Broadband Delivery System is provided in U.S. Pat. No. 6,157,719, entitled "Conditional Access System", which is hereby incorporated by reference herein in its entirety. Functions of the STS including: providing interfaces to content providers, service providers and entitlement agents; controlling access to and the use of the content and services; and distributing the content and services to subscribers. The content and services are conditionally accessible to subscribers of the STS. In order to access a service, a subscriber must be "entitled," i.e., a subscriber needs to be authorized to access the service. The content providers and services providers may not want to be in the business of managing entitlements for the subscribers of the STS. In that case, the content and services from the content and service providers are associated with an entitlement agent, and the entitlement agent provides the subscribers with the entitlements for the associated content and services. In addition, the operator of the STS can act as an entitlement agent for service and content providers that don't want to be involved with providing entitlements for services to subscribers.

The subscriber television system offers subscribers of the system services such as, but not limited to, Internet service and telephone service and potentially hundreds of program selections or service instances. Service instances include, but are not limited to, an installment of an audio or visual or audio/visual program. A service instance can be broadcast to all of the subscribers of the subscriber television system, a portion of the subscribers, or an individual subscriber. Service instances include regular programming, special programming such as pay-per-view, and subscriber requested services such as personal television.

Subscriber Television System

FIG. 1 is a block diagram depicting a non-limiting example of a subscriber television system (STS) 100. In this example, the STS 100 includes a headend 102, a network 104, and multiple digital subscriber communication terminal (DSCT) 110 located at subscriber premises 108. It will be appreciated that the STS 100 shown in FIG. 1 is merely illustrative and should not be construed as implying any limitations upon the scope of the preferred embodiments of the invention. For example, the STS 100 can feature a plurality of any one of the illustrated components, or may be configured with alternative embodiments for any one of the individual components or with yet other additional components not enumerated above. Subscriber television systems also included within the scope of the preferred embodiments of the invention include systems not utilizing physical structured cabling for transmission, such as, but not limited to, satellite systems.

A DSCT 110, which is located at a subscriber's premises 108, provides among other things, a two-way interface between the headend 102 of the STS 100 and the subscriber. The DSCT 110 decodes and further processes the signals for display on a display device, such as a television set (TV) 112 or a computer monitor, among other examples. Those skilled in the art will appreciate that in alternative embodiments the equipment for first decoding and further processing the signal can be located in a variety of equipment, including, but not limited to, a computer, a TV, a monitor, or an MPEG decoder, among others.

Secure communication between the headend 102 and the DSCT 110 is preferably accomplished using pairs of asymmetrical keys known to those skilled in the art, such as Rivest, Shamir, & Adleman (RSA) public key encryption technology. Briefly described, an asymmetrical key pair includes a public key, which is distributed to the public, and a private key, which is not distributed. Content that is encrypted with a public key can only be decrypted using the corresponding private key. A message that is signed with a private key is authenticated with the corresponding public key. The headend 102 and the DSCT 110 can securely communicate after they have exchanged public keys.

The headend 102 preferably receives content from at least one content provider 106. The headend 102 may include one or more server devices (not shown) for providing video, audio, and/or data to media client devices such as the DSCT 110. The headend 102 and the DSCT 110 cooperate to provide a user with audio/video services or television services via the television set 112. The television services may include, for example, broadcast television services, music services, cable television services, premium television services, video-on-demand (VOD) services, and/or pay-per-view (PPV) services, among others.

Figure 2:
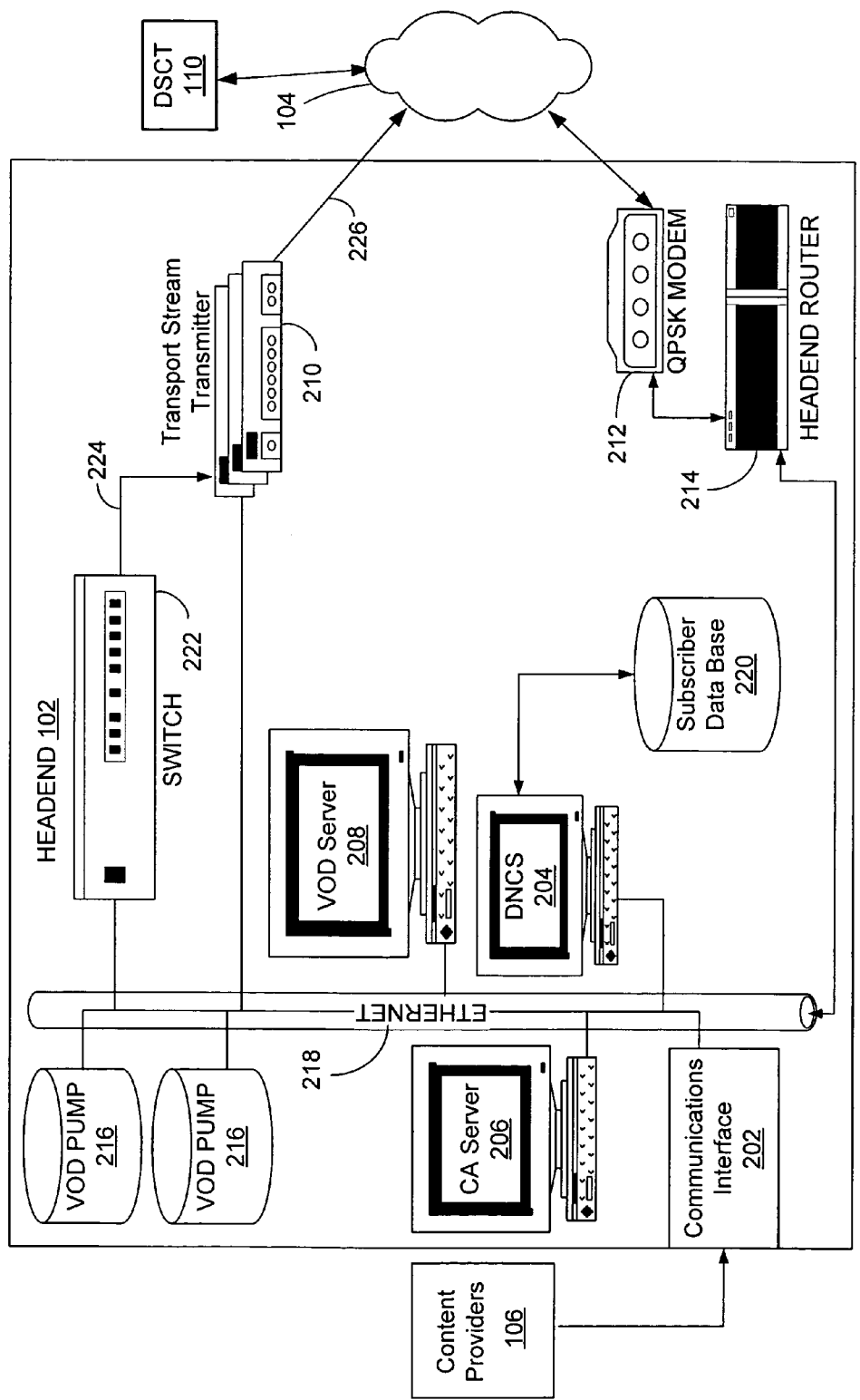
FIG. 2 is block diagram of a headend of a subscriber television system.

FIG. 2 illustrates some of the cooperating elements and interactions used to provide a program such as a VOD service, in accordance with one embodiment of the invention. FIG. 2 depicts a non-limiting example of selected components of a headend 102 that is configured in accordance with one embodiment of the present invention. It will be understood that the headend 102 shown in FIG. 2 is merely illustrative and should not be construed as implying any limitations upon the scope of the preferred embodiments of the invention.

The headend 102 receives content from the content providers 106, which can provide input in a variety of ways. The headend 102 combines the content from the various sources and distributes the content to subscribers via the distribution systems of the network 104, which includes a variety of transmission paths, including, but not limited to, satellites (not shown) and terrestrial broadcast transmitters and antennas (not shown).

The headend 102 receives programming signals from the content providers 106, and, after processing the content from the content providers 106 according to mechanisms described hereinbelow, the headend 102 transmits programming signals to the DSCTs 110 at the subscriber premises 108. Typically, the headend 102 transmits conventional analog signals, which will not be discussed, and digital signals. In one implementation, the digital signals are transmitted in MPEG format and embodiments of the present invention will be discussed in terms thereof. However, it is to be understood that describing embodiments of the present invention employing MPEG formatted packets is merely for exemplary and clarity purposes and is not a limitation on the scope of the present invention. The scope of the present invention is intended to extend to at least to all streams of information in where jitter is to removed.

As shown in FIG. 2, the selected components of the example headend 102 include a communications interface 202, a digital network control system (DNCS) 204, a conditional access (CA) server 206, a video-on-demand (VOD) server 208, a transport stream transmitter 210, a quadrature phase shift keying (QPSK) modem 212, a router 214, VOD pumps 216, and switch 222, and the components of the headend 102 are connected via an Ethernet 218. It will be understood by those having ordinary skill in the art that the exemplary headend 102 can include additional components, such as additional servers, switches, multiplexers, transport stream transmitters, among others, or can omit components. In one implementation, satellite signals are received by the communications interface 202, and the demodulated data carried in the satellite signals is sent via the Ethernet 218, or in other embodiments, via asynchronous transport mode (ATM), asynchronous serial interface (ASI), or some communications protocol known to those skilled in the art, to the VOD server 208, among other servers, for storage in a VOD pump 216.

The VOD server 208 receives and manages subscriber requests for programming that is stored in the VOD pumps 216. When the VOD server 208 receives a request from a subscriber for a program/service stored in one of the VOD pumps 216, the VOD server 208 initiates a VOD service by, among other things, providing the transport stream transmitter 210 with the requested program and informing the DNCS 204 about the request from the subscriber. In one embodiment, the VOD pump 216 transmits the requested program to transport stream transmitter 210, via the switch 222, employing UDP protocol. The VOD server 208 assigns a logical port number of the transport stream transmitter 210 to each VOD service. The transport stream transmitter 210 can then differentiate between different VOD services by using the logical port numbers of the different VOD services.

The DNCS 204 provides management, monitoring, and control of network elements and of the broadcast services provided to users. The DNCS 204 includes, among other modules, a subscriber database 220 that includes information about the subscribers for such purposes as billing information, survey data, among others. The DNCS 204 also communicates with the conditional access server 206 to provide for secure transmittal of content from the headend 102 to the DSCTs 110.

The CA server 206 selectively provides "entitlements" to the DSCTs 110 for the services and programming of the STS 100. In other words, among other things, the CA server 206 determines which DSCTs 110 of the STS 100 are entitled to access a given instance of service or program and provides the selected DSCTs 110 with the necessary keys and authorizations, among other things, to access the given instance of service. In addition, the CA server 206 informs the DNCS 204 of the entitlements of each of the DSCTs 110 in the STS 100 so that each subscriber can be properly billed. Furthermore, the CA server 206 includes a database (not shown) that includes, among other things, long term keys, the public keys of the DSCTs 110 and a private key for the CA server 206. The CA server employs long-term keys, public and private keys to securely communicate with the DSCTs 110.

The CA server 206 also provides encryption information such as a long-term key or a multi-session key (MSK) to the transport stream transmitter 210 and to the selected DSCTs 110. The transport stream transmitter 210 employs the MSK in encrypting the content of a program. In one embodiment, the transport stream transmitter 210 generates control words by encrypting a counter value with the MSK. The counter value is transmitted from the transport stream transmitter 210 to the DSCTs 110 in an Entitlement Control Message (ECM) and the control word is used to encrypt the content. A new control word is generated multiple times per minute using the same MSK, which typically has a lifetime of days or weeks, and for each new control word the corresponding counter value is transmitted in an ECM. The MSK is securely transmitted from the headend 102 to entitled DSCTs 110. The DSCTs 110 receive the counter values and use the MSK to generate the control words for decrypting the content of the instance of service (program). In another embodiment, the control word is generated by a random number generator, and an ECM carries the control word, which is encrypted, to the DSCT 110.

The QPSK modem 212 is responsible for transporting the out-of-band IP (Internet protocol) datagram traffic between the headend 102 and the DSCT 110. Data transmitted or received by the QPSK modem 212 may be routed by the headend router 214. Among other things, the headend router 214 may be used to deliver upstream data to the various servers, such as the VOD server 208.

The transport stream transmitter 210 receives a stream of network frames 224 from the switch 222 and transmits a stream of transport packets 226 to the DSCTs 110. The stream of network frames 224 is illustrated in FIG. 3, and the stream of transport packets 226 is illustrated in FIG. 4.

Figure 3:
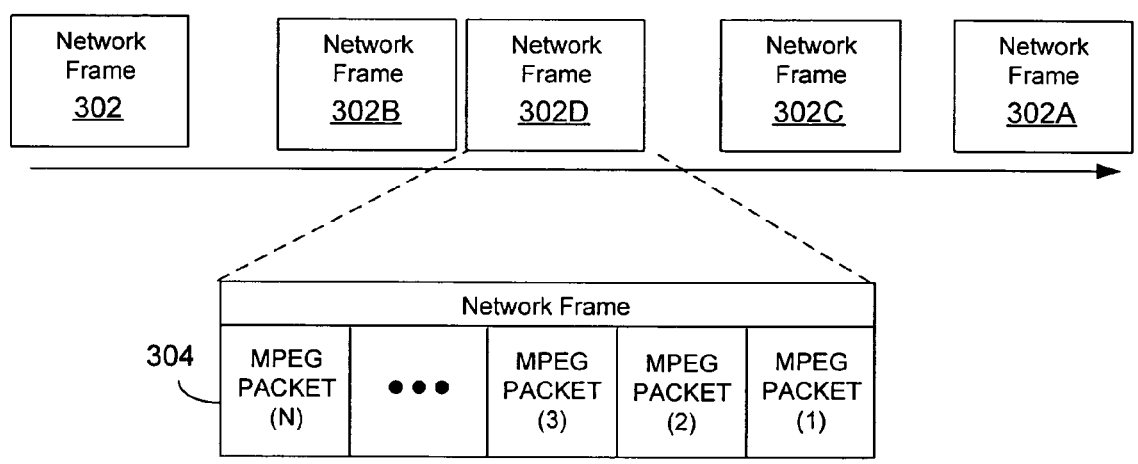
FIG. 3 is a block diagram of stream of network frames.

Referring to FIG. 3, the stream of network frames 224 is made up of an asynchronous sequence of network frames 302. Due to network congestion and other factors there are variable time gaps between network frames 302, which result in jitter. Another source of jitter is due to the multiplexing of streams of different programs. For example, network frames 302A and 302B each carry portions of the same program and should be received at the transport stream transmitter 210 consecutively, but the switch 222 has inserted network frames 302C and 302D in between network frames 302A and 302B, thereby delaying the network frame 302B.

In one preferred embodiment, each network frame 302 encapsulates multiple transport packets 304. For exemplary purposes, the transport packets 304 are illustrated as MPEG transport packets, which are of fixed size. The number of transport packets 304 encapsulated in a network frame 302 is generally a predetermined number. The predetermined number of transport packets is generally chosen such that the network frame 302 is as large as possible without exceeding the maximum transfer unit (MTU) size of the network extending between the VOD pump 216 and the transport stream transmitter 210. However, the present invention is not limited to network frames carrying a predetermined number of transport packets.

Figure 4:
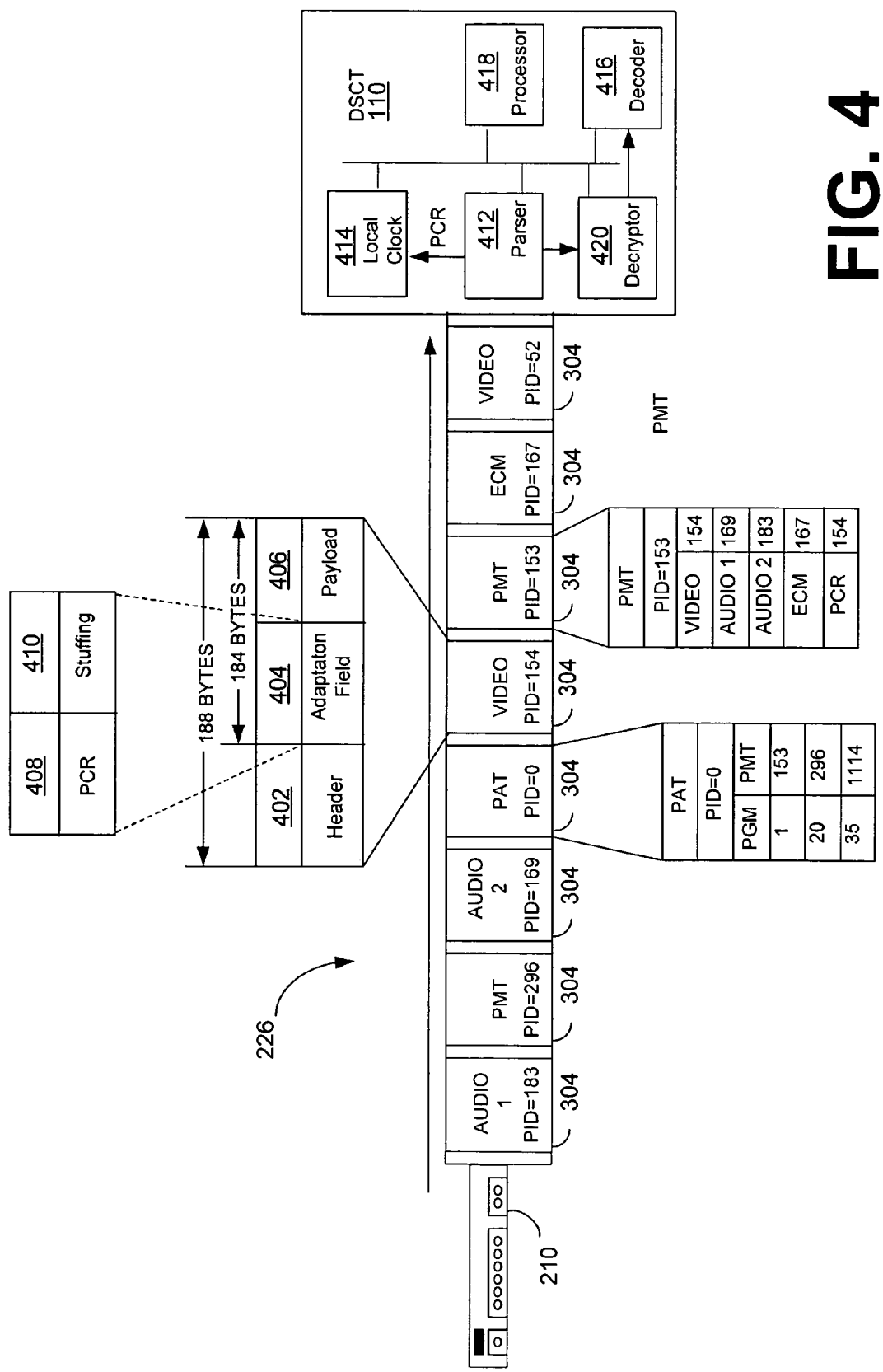
FIG. 4 is a block diagram of an MPEG transport stream and a DSCT that receives the MPEG transport stream.

Referring to FIG. 4, the transport stream 226 is made up of a series of transport packets 304. Here, the transport packets 304 form a synchronized stream. The transport stream transmitter 210 pumps transport packets 304 at an essentially piecewise constant rate one after the other to the DSCT 110.

A brief description of MPEG packets are provided herein-below, but further details are provided in the MPEG-1 standards (ISO/IEC 11172), the MPEG-2 standards (ISO/IEC 13818) and the MPEG-4 standards (ISO/IEC 14496) are described in detail in the International Organization for Standardization document ISO/IEC JTC1/SC29/WG11 N (June 1996 for MPEG-1, July 1996 for MPEG-2, and October 1998 for MPEG-4), which are hereby incorporated by reference.

Briefly described, an MPEG packet 304 is of fixed size, 188 bytes, and it includes a header 402, which is 4 bytes in size and which includes, among other things, a packet identifier (PID) field. The PID field is a 13-bit field that is used to identify packets and streams of packets. PID values range from 0 to 8,191, inclusive. The PID "0" is reserved for program association tables (PATs), as are other PID values. For example, the PID value 8,191 is reserved for stuffing packets, which are packets that are transmitted when there is no system packet or program packet available for downstream transmission.

MPEG packets 304 also include an adaptation field 404 and a payload 406. The adaptation field 404 and payload 406 are separately variable in length, but the aggregate length is 184 bytes. The header 402 also includes an adaptation size field that indicates the size of the adaptation field 404. In most MPEG packets 304, there is no adaptation field 404. However, when the adaptation field 404 is present, it is used for, among other things, carrying timing information in a PCR field 408 and when the size of the payload 406 is less than 184 bytes, carrying stuffing 410. The PCR field 408 is a total of 42 bits in size and it includes 33 bits that are used for a program clock reference base, corresponding to a 90 kHz clock, and 9 bits that are used by a program clock reference extension, corresponding to a 27 MHz clock. The program clock reference extension incremented from 0 to 299, after 300 increments, the program clock reference base is incremented. The program clock reference rolls over approximately every 26.5 hours. The MPEG-2 standard requires that the timestamps carried by consecutive PCR fields 408 be no more that 100 milliseconds apart.

Typically the payload 406 is a portion of a digital service, or a table, or a portion of a table, or other system information, and when the payload 406 carries a portion of a digital service, typically the portion of the digital service is encrypted. Only legitimate subscribers of the STS 100 have the necessary entitlements and keys for decrypting the payload 406. Selected services such as non-premium television programming or other programming can be carried without being encrypted.

System information such as, but not limited to, tables and messages are also carried in the payload 406 of the MPEG packet 304 and are typically carried without encryption. Among other things, system information includes PATs, Program Map Tables (PMTs), and Entitlement Control Messages (ECMs). Alternatively, system information can also be carried in the adaptation field 404.

A PAT associates digital services carried by the transport stream 226 with PMTs. For example, a given digital service, program 1, is associated with the PMT having PID "153" and a different service, program "20", is associated with the PMT having the PID "296".

A PMT associates elementary streams of a given service to their respective PID values. For example, for the given service identified in the PAT as program "1", the PMT for that program has the PID "153," and in this example, the given service is a movie or a television program or a video service that is made up of various elementary streams of content such as video, audio 1, audio 2, etc., where the different audio streams may carry audio tracts of the service in different languages. Thus, MPEG packets 304 having the PID "154" carry the video stream for the given service, and audio tract 1 for the given service is carried by the MPEG packets 304 having the PID "169". It should be noted that the PID values are uniquely assigned such that no two elementary streams of different services, or the same service, would have the same PID value. The PMT denoted by PID "153" also associates entitlement control messages (ECM) to a packet having the PID "167" and associates the PCRs 408 of the given program to packets having the PID "154".

The DSCT 110 includes, among other things, a parser 412, a local clock 414, and a decoder 416, a processor 418, and a decryptor 420. The parser 412 provides the processor 418 with the PATs and PMTs. The processor 418 uses the PAT to determine the PMT for a particular program and then uses the PMT for the particular program to determine the PID streams of the particular program including the PCR PID stream. The parser 412 provides the local clock 414 with timestamps carried in the PCR field 408. In addition, the parser 412 provides the PID streams of the particular program to the decryptor 420 and provides the ECM PID stream to the processor 418.

Responsive to the processor 418 determining the DSCT 110 has been entitled to access the program, the processor 418 provides the control words to the decryptor 420 for decrypting the program. The decryptor 420 then uses the control words to decrypt the encrypted payloads 406 of the transport packets 304 carrying the program and provides the decrypted payload to the decoder 416.

The local clock 414 receives the timestamps and uses the timestamps to lock its frequency to match the frequency of the encoder (not shown) that encoded the program. With the local clock 414 matching the frequency of the encoder, the decoder uses timing signals from the local clock 414 to synchronize the various elementary streams of the program.

Figure 5:
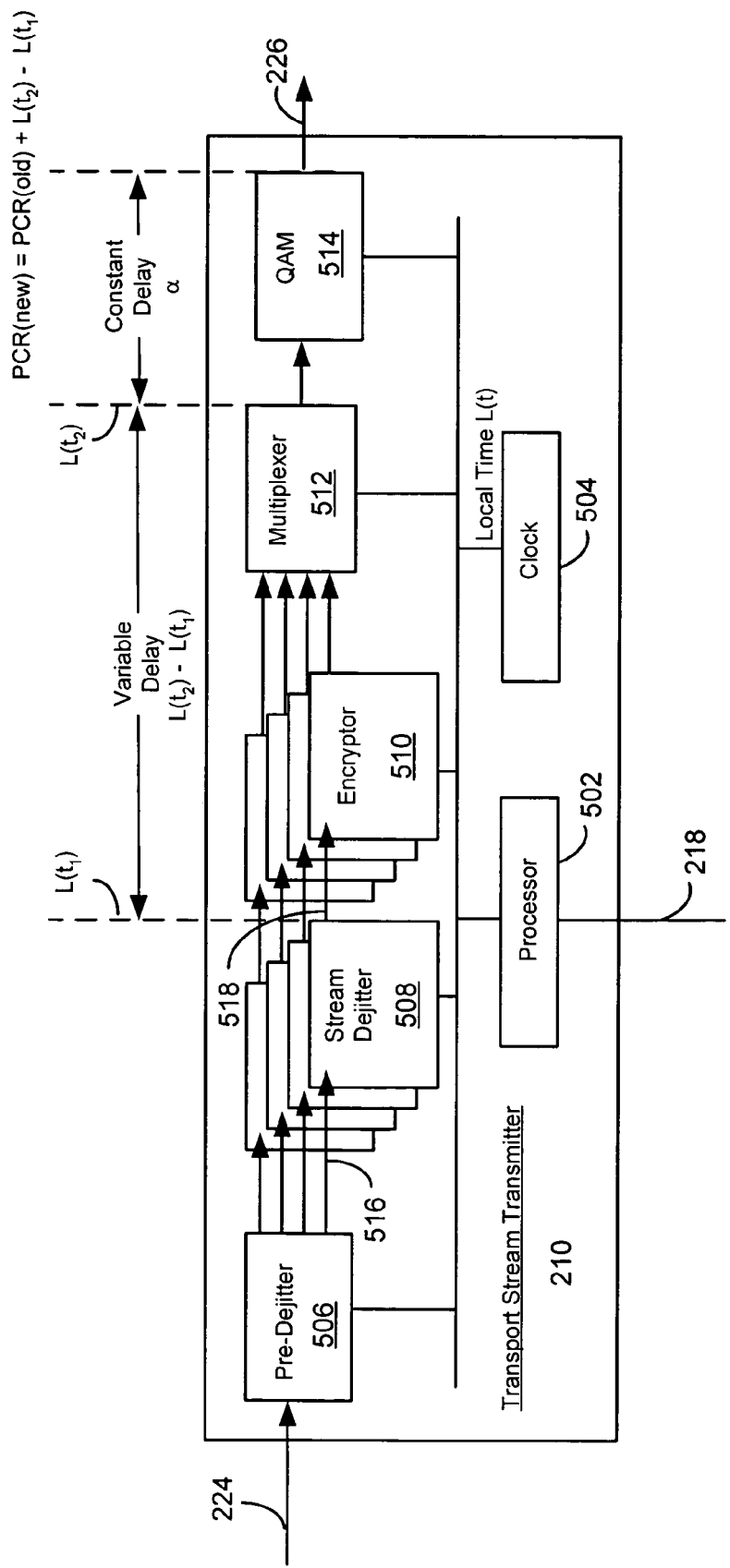
FIG. 5 is a block diagram of a transport stream transmitter.

Referring to FIG. 5, the transport stream transmitter 210 includes a processor 502, a clock 504, a pre-dejitterer 506, a plurality of dejitterers 508, a plurality of encryptors 510, a multiplexer 512 and a modulator 514. The pre-dejitterer 506 receives the stream of network frames 224 and de-encapsulates the transport packets 304 carried by the network frames 224. The pre-dejitterer 506 attaches a data unit header (DUH), which includes fields for carrying various processing, routing, and timing information, to the transport packets 304. The transport packets 304, with DUHs attached thereto, are then transmitted as jittered streams 516 to the dejitterers 508. The pre-dejitterer 506 receives processing instructions from the processor 502 so that each program stream carried in the stream of network frames 224 is transmitted to a separate dejitterer 508. The clock 504 generates the local time, L(T), and provides the dejitterers 508, and the multiplexer 512 with the current local time.

In the preferred embodiment, the pre-dejitterer 506 also calculates a clumping error estimate, E, which approximately compensates for the error introduced by clumping the multiple transport packets 304 into a single network frame 302. The clumping error estimate, E, is stamped into the DUH. The pre-dejitterer 506 also checks transport packets 304 for PCR fields 408, and responsive to finding a PCR field 408, the pre-dejitterer stamps the timestamp carried in the PCR field 408 in the DUH.

Each one of the dejitterers 508 receives a jittered stream 516 of transport packets 304 and outputs a continuous dejittered stream 518 of transport packets. The details of the dejitterer 508 are provided hereinbelow.

The dejittered streams 518 are further processed by the encrypters 510 and the multiplexer 512 and modulator 514. The processing that is done to the dejittered streams 518 between the dejitterer 508 and the modulator 514 reintroduces jitter because, among other things, multiplexing introduces variable delay. The modulator 514 is adapted to transmit packets 304 without causing variable delay. Thus, the time that a packet is transmitted from the modulator 514 is simply the time $L(T_2)$ that the packet was transmitted to the modulator 514 plus a known constant ($\alpha$). Any variable delay for a transport packet is introduced by the processing that is done after the dejitterer 508 and before the modulator 514. However, variable delays are compensated for so as to remove jitter. It should be recognized by those skilled in the art that the variable delay portion of the transport stream transmitter 210 can include different components or fewer components or more components than those shown.

In one preferred embodiment, when a transport packet 304 is transmitted from a dejitterer 508, the current local time, $L(T_1)$, is recorded in the DUH for that transport packet. Next, prior to the transport packet entering the constant delay portion of the transport stream transmitter 210, i.e., transmission to the modulator 514, the current local time, $L(T_2)$, is used in determining the variable delay. The variable delay for a packet is simply the difference $L(T_2)-L(T_1)$. When the transport packet 304 includes a PCR field 408, then the PCR field 408 is restamped with a new timestamp. The new timestamp is the variable delay, $L(T_2)-L(T_1)$, plus a PCR_local value that is determined by the dejitterer 508.

The processor 502 receives, among other things, program/system information from, among other things, the CA server 206 and VOD server 208. For example, the VOD server 208 tells the processor 502 that a particular logical port is assigned to a given program stream, and the CA server 206 provides encryption information such as the MSK to the processor 502 for that given program. The processor 502 then assigns a dejitterer 508 and an encryptor 510 to process that given program stream. Each one of the encryptors 510 receives a program stream and encrypts the payload 406 of the transport packets 304 using a control word SK.

The multiplexer 512 receives encrypted transport packets 304 and multiplexes them into a single transport stream for the modulator 514. Prior to transmitting the transport packets to the modulator 514, the multiplexer stamps the dejittered timestamp values into the PCR fields 408 of PCR bearing transport packets.

Figure 6:
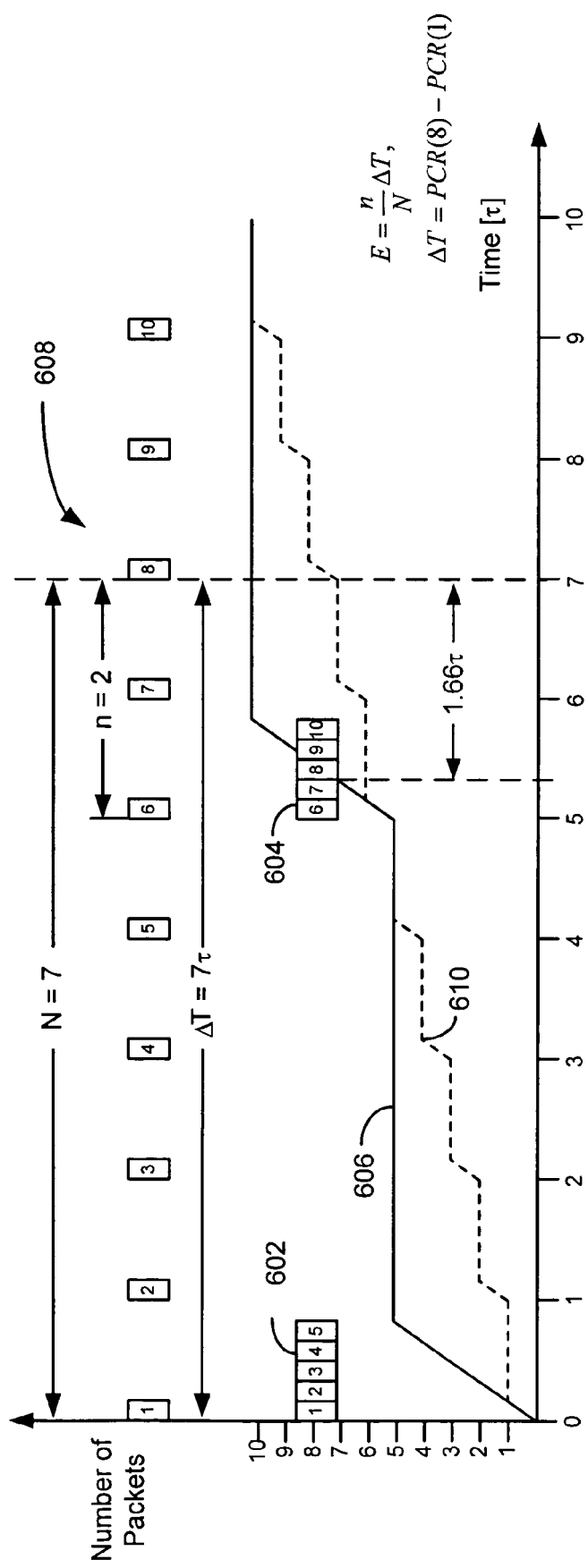
FIG. 6 is a graph of a number of transport packets arrived versus time.

FIG. 6 illustrates the effects of clumping due to carrying more than one transport packet in a network frame. The vertical axis represents the number of transport packets received at the transport stream transmitter 210 and the horizontal axis represents the time, which is given in an arbitrary time unit [$\tau$]. The network frames 602 and 604 each carry five transport packets and arrive at the transport stream transmitter 210 at time units $0\tau$ and $5\tau$, respectively. The solid line 606 represents the number of transport packets carried in network frames 602 and 604 that are received at the transport stream transmitter 210 as a function of time. For comparison purposes, a stream of network frames 608 having neither clumping nor jitter is illustrated. Each one of the network frames in stream 608 carries a single transport packet and are received one time unit ($\tau$) apart. The dashed line 610 represents the number of transport packets received as a function of time for the stream 608. In this example, assume there is no variable delay between the VOD pump 216 and the transport stream transmitter 210 and the network frames are pumped from the VOD pump 216 at a rate such that there is no jitter in stream 608. In other words, in stream 608, the arrival time of network frames that encapsulate transport packets having consecutive timestamps matches the difference in the timestamps. For example, if the first and eighth transport packets, which are carried by the first and eighth network frames of streams 608, each carry a timestamp, then the difference in their timestamps, PCR (8)–PCR(1), equals the difference in their arrival times ($7\tau$). Looking at network frame 604, it is clear that the eighth transport packet arrived at the transport stream transmitter too early and that the clumping of multiple transport packets into a single network frame has thereby introduced jitter. Specifically, the eighth transport packet has arrived approximately $1.66\tau$ too early.

In the preferred embodiment, the pre-dejitterer 506 calculates a clumping error estimate, E, for the clumping-jitter. The pre-dejitterer 506 first calculates the dynamic average bit rate by counting the number of transport packet bits between consecutive PCR fields 408 and dividing by the time difference of the consecutive timestamps, $\Delta T=PCR(M+1)-PCR(M)$. Because the transport packets are of fixed size, 188 bytes, instead of counting bits, the pre-dejitterer 506 may instead count the packets. The ratio of $N/\Delta T$, where N is the number of transport packets, is the average packet rate of the transport packets between consecutive timestamps. The reciprocal of the average packet rate is used to estimate the error in the arrival time for the second timestamp bearing packet. The clumping error estimate is given by $E=n/(N/\Delta T)$, where n is the number of transport packets interposing the second timestamp bearing transport packet and the first transport packet in the network frame carrying the second timestamp bearing packet. For example, there are seven packets between the first and eighth transport packets, thus N=7, and two transport packets between the sixth transport packet, which is the first transport packet of the network frame 604 and the eighth transport packet, thus n=2. In this case, the clumping error estimate is given by $E=(2/7)\times 7\tau=2\tau$, which means that the eighth transport packet arrived approximately $2\tau$ too soon. The faster the transmission rate between the VOD pump 216 and the transport stream transmitter 210 the better the clumping error estimate becomes. In our example, it takes the transport stream transmitter 210 approximately $0.83\tau$ to receive a network frame carrying 5 transport packets or approximately $0.166\tau$ per transport packet. If the transport stream transmitter 210 received a network frame carrying five transport packets in $0.1\tau$, then the transport stream transmitter 210 would receive each of the transport packets in approximately $0.02\tau$. Consequently, if the first bit of the sixth transport packet arrived at $5\tau$, then the first bit of the eighth transport packet would arrive approximately at $5.04\tau$, instead of $5.33\tau$, as in the previous example. In that case, our clumping error estimate still equals $2\tau$ and the actual error is $1.96\tau$, a difference of only $0.04\tau$. In one preferred embodiment, the transport rate, $T_r$, the rate at which the transport packets are received, is also used in the calculation of the clumping error, which is given by $E=n/(N/\Delta T)-n/T_r$.

Figure 7:
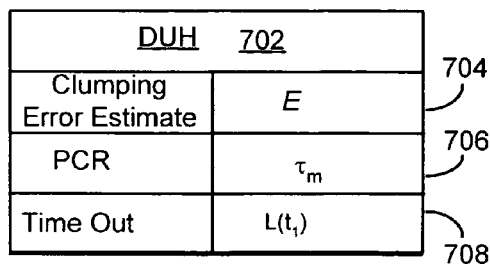
FIG. 7 is a block diagram of a data unit header.

Referring to FIG. 7, which illustrates a data unit header (DUH) 702 that the pre-dejitterer 506 attaches to the transport packet 304, the DUH 702 includes among other things fields for timing information, such as but not limited to, a clumping error estimate field 704 and a PCR timestamp field 706. When the pre-dejitterer 506 finds a transport packet 304 having a PCR field 408, the pre-dejitterer 506 reads the PCR field 408 and records the value of the timestamp in the PCR timestamp field 706. The pre-dejitterer 506 also records the error estimate, E, in the clumping error estimate field 704 for that PCR bearing transport packet. The DUH 702 also includes a time-out field 708 in which the dejitterer 508 stamps the current local time $L(T_1)$ into the time-out field 706 prior to the transport packet being transmitted from the dejitterer 508. The DUH 702 can also include, among other things, fields for carrying processing information and encryption information. In that case, the processor 502 provides the pre-dejitterer 506 with the processing and encryption information so that the pre-dejitterer can stamp the information into the appropriate fields of the DUH 702.

Figure 8:
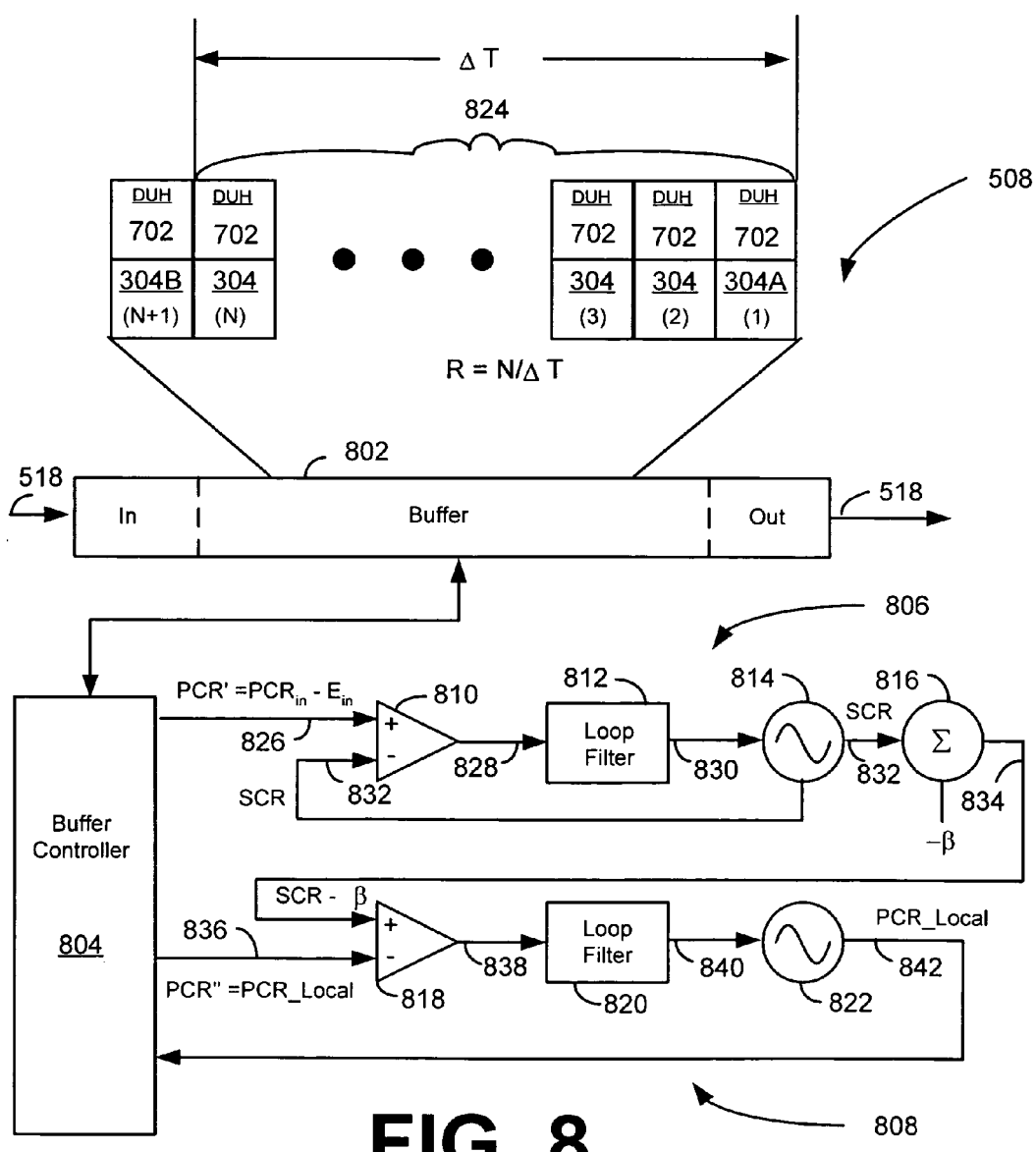
FIG. 8 is a block diagram of a dejitter.

Referring to FIG. 8, a dejitterer 508 includes a buffer 802, a buffer controller 804, a first locked loop 806, and a second locked loop 808. The buffer 802 receives the jittered stream 516, which is made up of transport packets 304 with DUHs 702 attached thereto, and output at a predetermined rate the dejittered stream 518.

In one preferred embodiment, the buffer 802 is large enough to hold more than one set of transport packets, wherein a set is defined as a first PCR bearing transport packet and non-PCR bearing transport packets that interpose the first PCR bearing transport packet and the next PCR bearing transport packet. For example, buffer 802 holds the set 824, which consists of "N" transport packets. The transport packet 304A is a PCR bearing transport packet, as is the transport packet 304B, which is the first transport packet of a subsequent set of transport packets.

Among other things, the buffer controller 804, controls the rate at which transport packets are released from the buffer 802. The rate at which the transport packets of set 824 are pumped out of the buffer 802 is simply given by the equation, $R=N/\Delta T$, where N is the number of transport packets in set 824, and $\Delta T$ is the difference of the timestamps of transport packets 304A and 304B.

The buffer controller 804 reads the DUH 702 attached to each transport packet 304, as the transport packet 304 and DUH 702 are buffered in the buffer 802. Whenever the DUH 702 includes a timestamp in the PCR timestamp field 706, the buffer controller 804 provides the first locked loop 806 a "corrected" input 826, PCR', which is given as $PCR'=PCR_{IN}-E_{IN}$, where $PCR_{IN}$ is the timestamp carried in PCR timestamp field 706 and $E_{IN}$ is carried in the clumping error estimate field 704 of the incoming DUH 702.

The first locked loop 806 includes a comparator 810, a loop filter 812, and a clock 814. The first locked loop produces an output 832, a system clock reference (SCR), which is fed back into the comparator 810. The comparator 810 determines the difference between its inputs, PCR' 826 and SCR 832, respectively, and outputs the difference 828 to the loop filter 812. The loop filter 812 essentially smoothes or averages its input 828 to produce an output 830 that does not include high-frequency variations. In other words, the output 830 of the loop filter 812 varies slowly. The clock 814 receives the output 830 of the loop filter 812 and adjusts its rate accordingly. The clock 814 speeds up responses to positive input, slows down responses to negative input, and remains constant responsive to the input equally zero.

Those skilled in the art will recognize that by providing the "corrected" input, PCR', to the comparator 810, the first locked loop 806 locks faster than it would if the comparator 810 had received $PCR_{IN}$ as an input. The rate at which the first locked loop 806 locks onto its inputs depends in part upon the loop filter 812 and its input. If the loop filter 812 is heavily damped so as to resist rapid fluctuations to its input, then the more slowly the first locked loop 806 will lock. In other words, it takes a long time to overcome a constant or quasi-constant offset when the loop filter 812 is heavily damped. The clumping error estimate, E, is always a positive offset with a magnitude that varies, based upon the relative position of the PCR bearing transport packet in the network frame. By subtracting the clumping error estimate, E, from the $PCR_{IN}$ we are able to provide the first locked loop 806 with a more accurate input, which means that there is less of an offset for the loop filter 812 to overcome. Lowering the error reduces the input jitter thereby producing a corresponding drop in the output jitter.

The clock 814 provides its output, the SCR 832, to an adder 816. The adder 816 subtracts an adjustable parameter β from the SCR 832, where β represents the average time that a transport packet 304 resides in the buffer 802, and outputs 834, SCR–β. The output 834 is input for the second locked loop 808.

The second locked loop 808 includes a comparator 818, a loop filter 820, and a clock 822. The clock 822 generates an output, PCR_local 842, which the buffer controller 804 uses to control the rate at which it puts out transport packets in the dejittered stream 518.

The buffer controller 804 reads the DUH 702 of transport packets 304 prior to transmitting them in the dejittered transport stream 518. When the PCR timestamp field 706 includes a timestamp for the current first-in transport packet 304, the buffer controller 804 provides the PCR to the comparator 818.

The comparator 818 determines the difference between PCR" 836 and the input 834, SCR–β. The average residence time β is subtracted from the SCR because the clock 814, which generated the SCR, is locked to the incoming PCR' which are later in time than the outgoing PCR". The comparator 818 produces an output 838, which is then inputted into the loop filter 820. The loop filter 820 smoothes or averages the input 838 so as to remove rapid oscillations and generates the output 840, which is inputted into the clock 822. The clock 822 produces the output PCR_local 842, which is used by the buffer controller to release packets. The average difference between the between the PCR" 836 and the input 834, SCR–β is forced to zero.

Prior to transmitting the current first-in transport packet 304, the buffer controller 804 stamps the current local time $L_1(T)$ in the time-out field 706 of DUH 702 attached to the current first-in transport packet 304. Although the components of the stream dejitterer 508 have been shown as separate modules, this has been done for the sake of clarity and is a non-limiting example. In alternative embodiments, one or more of the components of the stream dejitterer 508 can be implemented in hardware, software, or firmware among others. In one embodiment, the clock 814 does not generate the SCR, rather it generates the difference between the local time, L(T), as measured by the clock 504 and the incoming PCR values. Similarly, the output of clock 822 is related to the difference between the clock 504 and the PCRs of the outgoing transport packets 304. In this embodiment, the clock 504 is a master clock for running the clock 814 and 822 of the stream dejitterers 508. In this embodiment, the buffer controller 804 stamps the output of clock 822 in the DUH 702 prior to the current first-in transport packet being transmitted from buffer 802.

Figure 9:
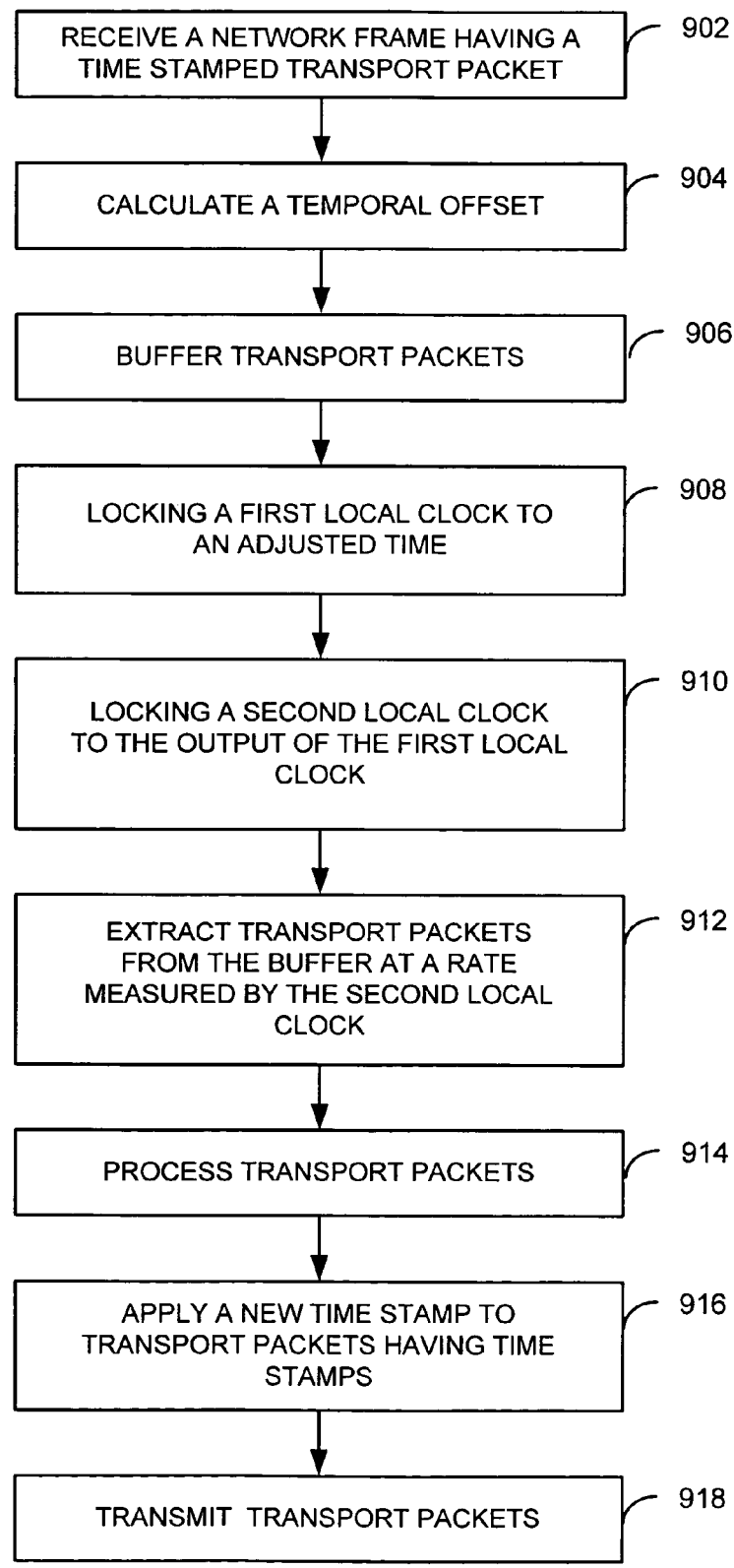
FIG. 9 is a flow chart of exemplary steps for dejittering a stream of packets.

Refer to FIG. 9, which illustrates exemplary steps taken by the transport stream transmitter 210, in step 902, the transport stream transmitter 210 receives in the stream of network frames 224 a network frame 302 having a transport packet 304 bearing a PCR time stamp 408. In step 904, the transport stream transmitter 210 calculates a temporal offset. The temporal offset is related to, among other things, the position of the transport packet 304 bearing the PCR time stamp 408 within the network frame 302. The temporal offset can also be related to the transmission rate of the network frames 224.

In step 906, the transport packets 304 are buffered in the FIFO buffer 802, and in step 908, the clock 814 of the first locked loop 806 is locked to an "adjusted time" associated with the PCR time stamp 408 of the most recent PCR bearing transport packet. The "adjusted time" is the difference between the PCR time stamp and the calculated temporal offset.

In step 910, the clock 822 of the second lock loop 808 is locked to the rate of the first lock loop. The output of the first locked loop is offset by a constant, which is approximately the desired delay of a packet in the buffer 802, and the offset output of the first locked loop is provided to the second locked loop as an input.

In step 912, transport packets 304 are extracted from the buffer 802 at a rate measured relative to the second locked loop. In step 914, the extracted transport packets 304 are further processed in the transport stream transmitter 210 and such processing can results in variable delay thereby re-introducing jitter.

In step 916, transport packets 304 bearing PCR time stamps 408 are re-stamped with a time measured relative to the clock 822 of the second locked loop 808. In step 918, the transport packets 304 are transmitted from the transport stream transmitter 210. It should be remembered that, in the preferred embodiment, the re-stamping in step 916 is done after any variable delay in processing the transport packets 304 in the transport stream transmitter 210, or in other words, when the delay between re-stamping and transmitting is a constant. The time that is stamped into the PCR time stamp 408 compensates for variable delay. Thus, variable delay in processing the transport packets 304 is accounted for by re-stamping PCR bearing transport packets after the variable delay.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although exemplary preferred embodiments of the present invention have been shown and described, it will be apparent to those of ordinary skill in the art that a number of changes, modifications, or alterations to the invention as described may be made, none of which depart from the spirit of the present invention. Changes, modifications, and alterations should therefore be seen as within the scope of the present invention. It should also be emphasized that the above-described embodiments of the present invention, particularly, any "preferred embodiments" are merely possible non-limiting examples of implementations, merely setting forth a clear understanding of the principles of the inventions.

What is claimed is:

1. A method of substantially removing jitter from a stream of packets transmitted from a transmission site to a reception site, the method comprising the steps of:

receiving from a transmission site at an intermediate site a stream of frames, wherein each frame encapsulates at least one packet therein;

de-encapsulating the at least one packet from each frame of the stream of frames;

providing the packets to a memory;

buffering packets of the stream of packets in the memory at the intermediate site interposing the transmission site and the reception site, wherein selected packets of the stream of packets include timestamps having time values for an external clock;

locking a first local clock with the time values of the timestamps included in the selected packets to the external clock;

extracting packets from the memory at a nominal rate controlled by a second local clock, wherein the second local clock is locked with the time values of the timestamps of the selected packets extracted from the memory based on the first local clock; and prior to the step of locking;

calculating an average bit rate for the received stream of frames between a first timestamp and a second timestamp;

calculating an offset for the second timestamp using the average bit rate; and subtracting the offset from the time value of the second timestamp.

2. The method of claim 1, wherein the step of calculating the average bit rate further includes the steps of:

receiving a first particular frame of the stream of frames, the first particular frame having a first particular selected packet having the first timestamp therein;

receiving a second particular frame of the stream of frames, the second particular frame having a second particular selected packet having the second timestamp therein;

determining the number of bits of packets between the first timestamp and the second timestamp inclusive of either the first timestamp or the second timestamp; and dividing the number of bits by the time difference between the first timestamp and the second timestamp.

3. The method of claim 1, wherein the step of calculating the offset further includes the steps of:

receiving a particular frame of the stream of frames having multiple sequential packets including a particular selected packet having the second timestamp therein;

determining the number of bits of packets between the particular packet and the start of the sequence of the multiple packets; and dividing the number of bits by the average bit rate.

4. The method of claim 1, further including the step of:

recording a time measured relative to the second local clock, wherein the recorded time is associated with when one of the selected packets is extracted from the memory.

5. The method of claim 4, further including the step of:

stamping a new time in the timestamp of the selected packets, wherein for each selected packet the new time compensates for variable delay between when the each selected packet is transmitted from the intermediate site and when the each selected packet was extracted from the memory; and transmitting from the intermediate site packets extracted from the memory, wherein the time values of the timestamps in the each selected packets are transmitted substantially jitter free.

6. The method of claim 1, further including the step of: stamping a new time in the timestamp of the selected packets extracted from the memory using the second local clock to set the new time.

7. The method of claim 1, further including the steps of:

recording an extraction time for each selected packet extracted from the memory, wherein the extraction time for each selected packet corresponds to the time of the second local clock when the selected packet was extracted from the memory;

associating each extracted selected packet with its extraction time;

determining a variable delay time for each extracted selected packet using the extraction time for the extracted selected packet, wherein the variable delay time corresponds to the delay between extraction from the memory and transmission from the intermediate site of the packet;

determining a new time value for the timestamp of each selected packet using the variable delay time and the second local clock.

8. A method of substantially removing jitter from a stream of packets transmitted from a transmission site to a reception site, the method comprising the steps of:
- receiving at an intermediate site a stream of frames, each frame encapsulating a set of packets, wherein selected packets include a timestamp defining a time value for a clock external to the intermediate site;
- de-encapsulating the set of packets from each frame;
- determining whether the set of packets from each frame includes a given selected packet having a timestamp therein;
- responsive to the set of packets including the given selected packet, determining a time offset for the given selected packet, wherein the time offset is based upon the position of the given selected packet within the frame in which the given selected packet was received, and stamping a new time value in the timestamp of the given selected packet, wherein the new time value is defined by subtracting the time offset from the time value for the external clock; and
- transmitting the packets from the intermediate site at a predetermined rate.

9. The method of claim 8, wherein the step of determining a time offset further includes the steps of:
- calculating for the stream of frames an average bit rate, wherein the average bit rate is defined as the number of bits or packets between a first timestamp included in a first selected packet and a second timestamp included in a second selected packet inclusive of either the number of bits in the first or the second timestamp divided by the change in time between the time values of the first and second timestamps;
- determining for the set of packets that includes the given selected packet the number of packet bits between the start of the set of packets and the first bit in the given selected packet; and
- dividing the number of packet bits by the average bit rate to generate the time offset.

10. The method of claim 8, further including the steps of:
- recording a first local clock time for each selected packet, the first local clock time corresponding to when the frame carrying the each selected packet arrived at the intermediate site;
- buffering in a memory the packets carried by the stream of frames;
- extracting packets from the memory at a rate clocked by the second local clock; and
- prior to transmitting each selected packet, recording a second local clock time and generating calculating for the stream of frames an average bit rate, wherein the average bit rate is defined as the number of bits of packets between a first timestamp included in a first selected packet and a second timestamp included in a second selected packet inclusive of either the number of bits in the first or the second timestamp divided by the change in time between the time values of the first and second timestamps;
- determining for the set of packets that includes the given selected packet the number of packet bits between the start of the set of packets and the first bit in the given selected packet; and
- dividing the number of packets bits by the average bit rate to generate a transmission time.

11. An apparatus for substantially removing jitter from a stream of packets transmitted from a transmission site to a reception site, the apparatus located at an intermediate site and comprising:
- a buffer having packets of the stream stored therein, wherein selected packets of the stream of packets include a timestamp, each timestamp having a time value from a clock external to the apparatus stamped therein;
- a buffer controller adapted to extract time values from the selected packets and extract packets from the buffer;
- a first locked loop having a first local clock, the first locked loop receiving time values from the buffer controller and locking the first clock thereto, wherein individual time values received by the first local clock are modified by subtracting a clumping error estimate therefrom, the clumping error estimate being based on an average bit rate of the stream of packets;
- a second locked loop having a second local clock, the second locked loop receiving timing information relative to the first local clock and locking the second local clock thereto, wherein the buffer controller receives timing signals from the second local clock and extracts buffered packets at a rate measured relative to the second local clock.

12. The apparatus of claim 11, further including:
- a transmitter adapted to receive packets extracted from the buffer and transmit the packets therefrom, wherein the time value for each selected packet extracted from the buffer is set relative to the second local clock.

13. The apparatus of claim 11, wherein responsive to the buffer receiving a given selected packet, the buffer controller provides the first locked loop with the time value of the given selected packet.

14. The apparatus of claim 11, wherein responsive to the buffer controller extracting a given selected packet from the buffer, the buffer controller provides the second locked loop with the time value of the given selected packet.

15. The apparatus of claim 11, further including:
- means for receiving a stream of frames, each frame of the stream of frames encapsulating a set of packets of the stream of packets arranged in a given order; and
- an unencapsulator adapted to unecapsulate the set of packets from each frame of the stream of frames and to provide the packets of each set to the buffer in the given order.

16. The apparatus of claim 15, wherein the unencapsulator is further adapted to determine a temporal offset for a given selected packet included in a given set of packets by the location of the given selected packet in the given set of packets.

17. The apparatus of claim 16, wherein the unencapsulator is further adapted to determine a new time value by subtracting the temporal offset from the time value of the timestamp of the given selected packet and stamp the new time value in the timestamp of the given selected packet.

18. The apparatus of claim 11, wherein the timing information received by the second locked loop is the current time of the first local clock minus an offset.

19. The apparatus of claim 18, wherein the offset is a predetermined time corresponding to desired length of time that a given packet resides in the buffer.

20. An apparatus for substantially removing jitter from a stream of transport packets transmitted from a transmission site to a reception site, the apparatus located at an intermediate site and comprising:

an input port adapted to receive a stream of network frames carrying the stream of transport packets;

a de-encapsulator in communication with the input port adapted to extract the transport packets from the network frames;

a buffer in communication with the de-encapsulator having transport packets of the stream of transport packets stored therein, wherein selected transport packets include a timestamp, each timestamp having a time value from a clock external to the apparatus stamped therein;

a first locked loop having a first local clock, wherein the first locked loop receives a time value related to the timestamp of the last buffered selected packet for locking the first local clock thereto;

a buffer controller in communication with the buffer and the first locked loop, the buffer controller adapted to provide the time value related to the timestamp of the last buffered selected packet to the first locked loop minus a clumping error estimate that is based on an average bit rate of the stream of transport packets and extract packets from the buffer at a predetermined rate on a first-in first-out basis, and wherein the rate of extraction is such that the extracted packets are substantially jitter free; and a second locked loop in communication with the buffer controller and the first locked loop, the second locked loop having a second local clock, the second locked loop receiving timing information relative to the first local clock and locking the second local clock thereto, wherein the buffer controller receives timing signals from the second local clock and the rate of extraction is measured relative to the second local clock.

21. The apparatus of claim 20, further including:

a transmitter adapted to receive packets extracted from the buffer and transmit the packets therefrom, wherein the time value for each selected packet extracted from the buffer is set relative to the second local clock.

22. The apparatus of claim 20, wherein responsive to the buffer receiving a given selected packet, the buffer controller provides the first locked loop with the time value of the given selected packet.

23. The apparatus of claim 20, wherein the buffer controller provides feedback to the second locked loop.

24. The apparatus of claim 23, wherein responsive to the current first-in transport packet being one of the selected transport packets, the feedback provided by the buffer controller is related to the time value of current first-in transport packet.

* * * * *